United States Patent Office 3,479,399
Patented Nov. 18, 1969

3,479,399
PROCESS FOR THE PRODUCTION OF
ALKALI METAL TEREPHTHALATES
Tamotsu Murase, Ichiro Mikami, and Moriyosi Tamura, Tokyo, Japan, assignors to Ube Industries Ltd., Yamaguchi-ken, Japan
No Drawing. Filed Aug. 14, 1964, Ser. No. 389,795
Int. Cl. C07c 51/14, 63/28
U.S. Cl. 260—515       7 Claims

ABSTRACT OF THE DISCLOSURE

A process for producing an alkali terephthalate by the reaction of alkali benzoate with alkali carbonate and carbon monoxide at a relatively high temperature under high pressure in the presence of a catalyst, while avoiding the presence of oxygen and water in the reaction system.

---

This invention relates to a process for the production of aromatic dicarboxylates, more specifically, to a process for the production of alkali salts of aromatic dicarboxylic acids by reacting alkali carbonates, carbon monoxide and alkali salts of the corresponding aromatic monocarboxylic acid at a temperature less than 500° C. under a pressure of carbon monoxide and in the presence of a catalyst.

The known method, usually known as the so-called "Second Henkel Method," is one in which the potassium salt of an aromatic monocarboxylic acid is heated under a pressure in the presence of gaseous carbon dioxide and potassium carbonate to thereby obtain an aromatic dicarboxylate. In this method, at most 0.5 mole of aromatic dicarboxylate is produced per mole of potassium benzoate and at the same time 0.5 mole of benzene is produced as a by-product. Many improvements have been suggested in regard to this method, and, in order to obtain more than 0.5 mole of aromatic dicarboxylate per mole of potassium benzoate, the reaction is carried out either in the presence of carbon dioxide under a pressure higher than 400 atm., preferably under a pressure of ca. 1500 atm., or under the pressure of carbon dioxide with the addition of potassium cyanate or under a pressure of carbon dioxide with the addition of large excess of an acid-binding agent.

We have discovered that carbon monoxide participated in the reaction when carbon monoxide was employed instead of carbon dioxide in "Second Henkel Method." More particularly, we discovered that more than 0.5 mole of alkali salts of aromatic dicarboxylic acids were formed per mole of alkali salts of aromatic monocarboxylic acids when gaseous carbon monoxide, alkali carbonates and alkali salts of aromatic monocarboxylic acid were reacted, even at a pressure lower than 400 atm., which is similar to that of "Second Henkel Method." The reaction in this case, potassium salt being employed for example, is as follows:

$$C_6H_5COOK + CO + K_2CO_3 \rightarrow C_6H_4(COOK)_2$$

The great difference between the method embodying this invention and "Second Henkel Method" is to decrease the formation of benzene produced by the disproportionation reaction which is the main reaction of "Second Henkel Method" by the use of carbon monoxide instead of carbon dioxide, and thus the yield of aromatic dicarboxylic acids shows a large increase. For example if 1 mole of potassium benzoate is used, 0.5 mole of terephthalic acid and 0.5 mole of benzene are theoretically formed according to "Second Henkel Method," but by the method embodying this invention 0.5 mole or more of terephthalic acid is formed but the formation of benzene is less than 0.1 mole, in addition to this ca. 0.2 mole or more of isophthalic acid, tricarboxylic acid etc. and unreacted benzoic acid can be obtained, thus the formation of total carboxylic acids amounts to 0.7 mole or more.

As the starting material, alkali salts of aromatic monocarboxylic acid are used. The potassium salt is especially suitable for alkali salt of this type, but, in addition to this, the salts of either lithium, sodium or cesium may also be used.

As for the alkali carbonates, the most suitable one is potassium carbonate, but salts of either lithium, sodium, rubidium or cesium may also be used. These alkali carbonates are preferably employed in an amount equal to or greater than that of aromatic monocarboxylate.

As catalysts of this reaction, active carbon, metallic cadmium, zinc, lead, iron, titanium, copper, aluminum and silicon or compounds of these metals such as oxides, halides, carbonates and salts of organic acids or a mixture thereof are effective. The above-mentioned catalysts may be used excessively, but the amount of catalyst employed may be within the range of 0.05–25% in most cases.

The reaction is carried out in the presence of gaseous carbon monoxide.

In the execution of this reaction, the presence of water should be especially avoided. In addition, it is desirable that oxygen be eliminated as far as possible. This reaction begins at 250° C. The most convenient temperature varies with the catalyst and the conditions of pressure, etc., but a temperature ranging from 350 to 480° C. is generally chosen. A temperature higher than 500° C. must be avoided because the decomposition of the product becomes intense and leads to carbonization.

In order to carry out this reaction, at first the starting materials are completely dried by the usual methods and made anhydrous, and then crushed and mixed well in a ball mill or the like. The reaction is carried out in an autoclave with a stirrer or a rotary autoclave under the pressure of gaseous carbon monoxide. After the reaction is completed, the reaction mixture is taken out of the autoclave and dissolved in water. The insoluble matter being filtered off, the filtrate is separated. The aromatic dicarboxylic acids, such as terephthalic acid, are precipitated by an acid from the filtrate, then filtered, washed with water, and dried. On the other hand, the water-soluble acids are extracted and separated by ether extraction from the filtrate.

The invention will now be further explained in the examples set forth below:

EXAMPLE 1

10 g. of potassium benzoate, 20 g. of anhydrous potassium carbonate, and, as the catalyst, 1.5 g. of cadmium fluoride and 1.0 g. of active carbon were crushed together and mixed well. This mixture was set in an autoclave of inner volume 100 cc., and oxygen was sufficiently eliminated. Then carbon monoxide gas was filled up to 120 atm., and the autoclave was heated at 430° C. for 1½ hours. The maximum pressure in the course of the reaction was 270 atm.

After the reaction was completed the autoclave was cooled, then the reaction product was dissolved in hot water and the insoluble matter was filtered off. The transparent filtrate was made acidic with hydrochloric acid after heating. The white precipitate formed of terephthalic acid was filtered by suction while hot and then washed with water. 5.1 g. of formed terephthalic acid was obtained. Besides, 2.3 g. of material extracted with ether was obtained from the filtrate. The ether-extracted substance mentioned above was identified as a mixture of benzoic acid, isophthalic acid and trimesic acid, by means of infrared spectroscopic analysis. Consequently the aromatic carboxylic acids formed amounted to 7.4 g. On the other hand, benzene produced in the course of reaction was only 0.4 g.

COMPARATIVE EXAMPLE 10 g. of potassium benzoate, 20 g. of anhydrous potassium carbonate, 1.5 g. of cadmium fluoride and 1.0 g. of active carbon were set in an autoclave in the same manner as in Example 1, and liquefied carbon dioxide was filled up to 50 atm. The autoclave was heated at 430° C. for 1½ hrs. The pressure reached 300 atm. in the course of reaction.

After the reaction was completed, the reaction product was treated in a manner similar to Example 1, whereby 4.6 g. of terephthalic acid and 0.4 g. of ether-extracted substance were obtained. Therefore the produced amount of aromatic carboxylic acid was 5.0 g. On the other hand, benzene produced in this reaction was 2.4 g.

EXAMPLE 2

5 g. of potassium benzoate, 7.5 g. of potassium carbonate, and, as the catalyst, 1.0 g. of cadmium fluoride and 0.5 g. of active carbon were treated in a same manner as Example 1 and set in an autoclave. Then carbon monoxide gas was filled up to 110 atm. and the autoclave was heated at 430° C. for 6 hours. The maximum pressure in the course of reaction was 250 atm.

After the reaction was completed, a treatment similar to Example 1 being carired out, 2.4 g. of terephthalic acid and 1.1 g. of ether-extracted substance, that is to say, 3.5 g. of aromatic carboxylic acid in total were obtained. Benzene produced in the course of reaction was 0.1 g.

EXAMPLE 3

5 g. of potassium benzoate, 10 g. of potassium carbonate, and, as the catalyst, 1.0 g. of zinc oxide and 0.5 g. of active carbon were treated similarly and set in an autoclave. Then carbon monoxide gas was filled up to 140 atm. and the heating was carried out at 435° C. for 3 hours.

The maximum pressure in the course of the reaction reached 310 atm. After the reaction was completed the reaction product was treated in a similar manner, and 2.2 g. of terephthalic acid and 1.3 g. of ether-extracted substance, that is to say, 3.5 g. of aromatic carboxylic acids were obtained. Benzene produced in this reaction was 0.1 g.

EXAMPLE 4

5 g. of potassium benzoate, 10 g. of potassium carbonate, and, as the catalyst, 0.5 g. of cadmium fluoride and 0.2 g. of active carbon were treated similarly and set in an autoclave, then carbon monoxide, carbon dioxide and nitrogen, in molar ratio 40:30:30, were added. The heating was carried out at 435° C. for one hour and a half. The maximum pressure in the course of reaction was 290 atm. After the reaction was completed, the reaction product was treated similarly, thus 3.3 g. of terephthalic acid, 0.2 g. of other aromatic carboxylic acids and 0.6 g. of benzene were obtained.

EXAMPLE 5

0.5 g. of ferrous oxide and 0.2 g. of active carbon as the catalyst were added to the same sample as in Example 4, and the mixture was set in an autoclave after crushing and mixing, then a mixture of carbon monoxide and carbon dioxide, in molar ratio 75/25 was filled to 130 atm. The reaction was carried out at 435° C. for 1½ hours. The maximum pressure was 300 atm. After the reaction was complete, the reaction product being treated, 2.2 g. of terephthalic acid, 1.0 g. of another aromatic carboxylic acid and 0.5 g. of benzene were obtained.

What we claim is:

1. A process for producing an alkali terephthalate comprising reacting an alkali benzoate with an alkali carbonate in an atmosphere consisting essentially of carbon monoxide at a temperature of 250° to 500° C. under a pressure of 200–1000 atmospheres of carbon monoxide in the presence of a catalyst selected from the group consisting of the oxides, halides, carbonates, organic acid salts and complex salts of cadmium, zinc and a mixture thereof with activated carbon in the absence of oxygen and water.

2. The process of claim 1 wherein an inert gas is present in addition to carbon monoxide.

3. The process of claim 1 wherein the alkali carbonate is potassium carbonate.

4. The process of claim 1 wherein the alkali benzoate is potassium benzoate.

5. The process of claim 1 wherein the temperature is 350°–480° C.

6. The process of claim 1 wherein the catalyst is present in an amount of 0.05–25%.

7. A process for producing potassium terephthalate comprising reacting potassium benzoate with potassium carbonate in an atmosphere consisting essentially of carbon monoxide at a temperature of 350–480° C. under pressures of 200–400 atmospheres of carbon monoxide in the presence of cadmium fluoride and the absence of oxygen and water.

References Cited

UNITED STATES PATENTS 2,863,914  12/1958  Raecke _____ 260—515

OTHER REFERENCES

Sherwood, "Terephthalic Acid by Isomerization and Disproportionation," Chemistry and Industry, Aug. 27, 1960, pp. 1096–1100.

JAMES A. PATTEN, Primary Examiner